United States Patent
Li

(10) Patent No.: US 9,920,687 B2
(45) Date of Patent: Mar. 20, 2018

(54) ROTARY ENGINE AND ROTARY UNIT THEREOF

(76) Inventor: Gang Li, Liaoning (CN)

( * ) Notice: Subject to any disclaimer, the term of this patent is extended or adjusted under 35 U.S.C. 154(b) by 1312 days.

(21) Appl. No.: 13/995,006

(22) PCT Filed: Dec. 1, 2011

(86) PCT No.: PCT/CN2011/083319
§ 371 (c)(1),
(2), (4) Date: Aug. 22, 2013

(87) PCT Pub. No.: WO2012/079468
PCT Pub. Date: Jun. 21, 2012

(65) Prior Publication Data
US 2014/0299094 A1    Oct. 9, 2014

(30) Foreign Application Priority Data

Dec. 16, 2010  (CN) .......................... 2010 1 0593208

(51) Int. Cl.
*F02B 53/10* (2006.01)
*F01C 1/10* (2006.01)
(Continued)

(52) U.S. Cl.
CPC ............. *F02B 53/10* (2013.01); *F01C 1/103* (2013.01); *F01C 1/104* (2013.01); *F01C 11/004* (2013.01);
(Continued)

(58) Field of Classification Search
CPC .......... F02B 53/10; F02B 53/02; F02B 53/08; F01C 1/10; F01C 1/104; F01C 1/103;
(Continued)

(56) References Cited

U.S. PATENT DOCUMENTS

| 724,665 A | * | 4/1903 | Cooley ................... F01C 1/103 418/122 |
| RE21,316 E | * | 1/1940 | Hill ......................... B23F 15/08 74/462 |

(Continued)

FOREIGN PATENT DOCUMENTS

| CA | 2584964 A1 | * | 5/2006 | ............. F01C 1/103 |
| CN | 2057218 | | 5/1990 | |

(Continued)

OTHER PUBLICATIONS

International Search Report for PCT/CN2011/083319, English translation attached to original, Both completed by the Chinese Patent Office dated Feb. 22, 2012, All together 6 Pages.

*Primary Examiner* — Phutthiwat Wongwian
*Assistant Examiner* — Jason T Newton
(74) *Attorney, Agent, or Firm* — Brooks Kushman P.C.

(57) ABSTRACT

A rotary engine and a rotary unit thereof are provided. The rotary engine includes an air-compressed rotary unit provided in an engine body and a power rotary unit moving in coordination with the air-compressed rotary unit. Each rotary unit includes an outer rotor and an inner rotor provided eccentrically within the outer rotor, inner teeth constituted by convex arc surfaces are formed in an inner circumference of the outer rotor and outer teeth constituted by concave arc surfaces are formed in an outer circumference of the inner rotor, such that intake and compression strokes of the air-compressed rotary unit and power and exhaust strokes of the power rotary unit are achieved during the engagement and disengagement between the inner and outer teeth. The rotary engine has a compact structure, a smooth output torque, a high power per liter, and can be widely used in fields of vehicle, power machinery, etc.

37 Claims, 9 Drawing Sheets

(51) Int. Cl.
*F01C 11/00* (2006.01)
*F02B 53/02* (2006.01)
*F02B 53/08* (2006.01)

(52) U.S. Cl.
CPC .............. *F02B 53/02* (2013.01); *F02B 53/08* (2013.01); *F04C 2240/603* (2013.01); *Y02T 10/17* (2013.01)

(58) Field of Classification Search
CPC ........ F01C 11/004; F01C 17/02; F01C 17/00; F01C 1/084; F01C 18/10; F04C 1140/603; Y02T 10/17
USPC ..... 418/160, 161, 164, 191; 123/18 A, 18 R, 123/45 A, 45 R, 200, 205
See application file for complete search history.

(56) References Cited

U.S. PATENT DOCUMENTS

| | | | |
|---|---|---|---|
| 2,740,386 A | 4/1956 | Crandall | |
| 2,866,417 A * | 12/1958 | Nubling | F01C 1/084 418/114 |
| 2,989,951 A * | 6/1961 | Charlson | F01C 1/104 418/160 |
| 3,029,793 A * | 4/1962 | Luck | F04C 18/10 418/171 |
| 3,082,747 A * | 3/1963 | Luck | F01C 1/103 418/114 |
| 3,083,894 A * | 4/1963 | Luck | F02B 53/00 418/150 |
| 3,117,561 A | 1/1964 | Bonavera | |
| 3,126,755 A * | 3/1964 | Luck | F02B 53/00 418/171 |
| 3,133,694 A * | 5/1964 | Luck | F04C 18/10 418/100 |
| 3,236,213 A * | 2/1966 | Yokoi | F02B 53/00 123/213 |
| 3,298,331 A | 1/1967 | Butler | |
| 3,387,771 A * | 6/1968 | Luck | F02B 53/00 418/164 |
| 3,443,378 A * | 5/1969 | Goff | B62D 5/097 418/171 |
| 3,452,723 A * | 7/1969 | Keylwert | F02B 53/00 418/186 |
| 3,671,154 A * | 6/1972 | Kenobi | F04C 18/10 418/131 |
| 3,711,225 A * | 1/1973 | Kolbe | F04C 18/10 417/440 |
| 3,732,689 A | 5/1973 | Tado et al. | |
| 3,823,695 A * | 7/1974 | Swartz | F01C 1/104 123/235 |
| 3,858,557 A * | 1/1975 | Myers | F02B 53/08 123/213 |
| 3,922,120 A * | 11/1975 | McCullough | F01C 1/104 123/242 |
| 3,985,476 A | 10/1976 | Hofbauer | |
| 4,735,560 A * | 4/1988 | Wydra | F01C 19/08 277/399 |
| 5,046,932 A * | 9/1991 | Hoffmann | F04C 18/10 418/101 |
| 6,336,317 B1 * | 1/2002 | Holtzapple | F01C 1/103 417/274 |
| 6,907,855 B2 | 6/2005 | Mueller | |
| 7,726,959 B2 * | 6/2010 | Holtzapple | F01C 1/103 418/171 |
| 8,753,099 B2 * | 6/2014 | Holtzapple | F01C 1/104 277/303 |
| 2003/0215345 A1 * | 11/2003 | Holtzapple | F01C 1/10 418/171 |
| 2003/0228237 A1 * | 12/2003 | Holtzapple | F01C 1/10 418/171 |
| 2005/0233853 A1 | 10/2005 | Suebsinskuichai | |
| 2010/0326753 A1 | 12/2010 | Garside | |

FOREIGN PATENT DOCUMENTS

| | | | | |
|---|---|---|---|---|
| CN | 2101764 | | 4/1992 | |
| CN | 1094477 | | 11/1994 | |
| CN | 1292453 | | 4/2001 | |
| CN | 1175174 | | 11/2004 | |
| CN | 101403335 | | 4/2009 | |
| DE | 2809571 | A1 * | 9/1979 | ............. F04C 18/10 |
| DE | 2948746 | A1 * | 3/1982 | ............. F01C 1/104 |
| DE | 19501192 | | 7/1996 | |
| DE | 19849234 | A1 * | 4/2000 | ............. F04C 18/10 |
| DE | 19850752 | A1 * | 5/2000 | ............. F04C 18/10 |
| DE | 102004012962 | A1 * | 9/2004 | ............. F01C 1/104 |
| GB | 195934 | A * | 3/1924 | ............. F04C 18/10 |
| GB | 2458481 | | 9/2009 | |
| JP | S4217047 | | 10/1967 | |
| JP | 4634126 | | 10/1971 | |
| JP | 63192901 | A * | 8/1988 | ............. F01C 1/104 |
| JP | 2004360711 | A * | 12/2004 | ............. F16D 65/18 |
| JP | 2006118487 | A | 5/2006 | |
| KR | 20020088524 | | 11/2002 | |
| KR | 20030084843 | | 11/2003 | |
| RU | 2059833 | | 5/1996 | |
| RU | 2355899 | | 5/2009 | |

* cited by examiner

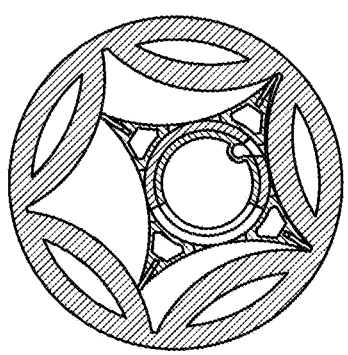
FIG.8E
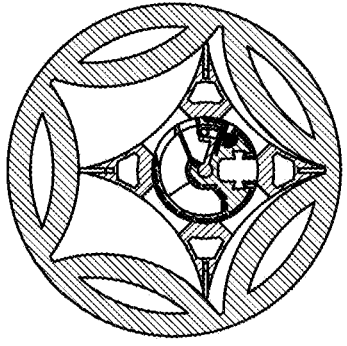
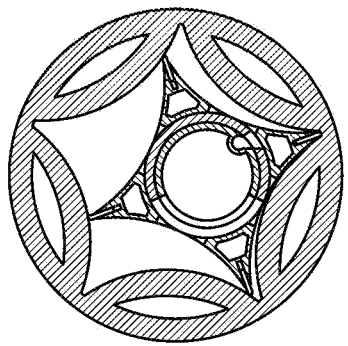
FIG.8F
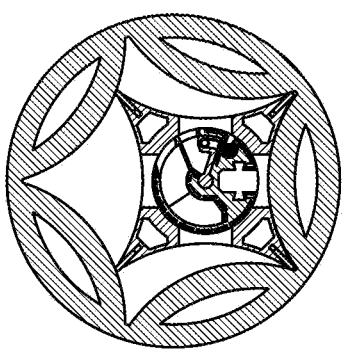
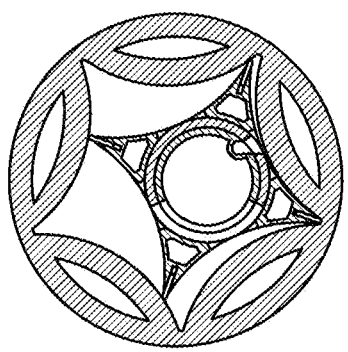
FIG.8G
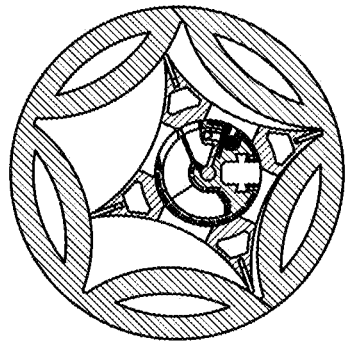

ROTARY ENGINE AND ROTARY UNIT THEREOF

CROSS-REFERENCE TO RELATED APPLICATIONS

This application is the U.S. national phase of PCT Application No. PCT/CN2011/083319 filed Dec. 1, 2011, which claims priority to Chinese Patent Application No. 201010593208.0 filed Dec. 16, 2010, which are incorporated herein by reference.

BACKGROUND

Technical Field

The present disclosure relates to an engine that can be widely used in fields of motor vehicle and power machinery. In particular, the present disclosure relates to a rotary engine that performs power strokes through the rotary motion of a rotor, and a rotary unit thereof.

Background Art

In a conventional engine, a working piston performs a reciprocating rectilinear motion in a cylinder, and the rectilinear motion of the piston is converted into rotary motion by using a crank link mechanism. In such a conventional engine, four-stroke engine has a complicated valve mechanism, a small power-weight ratio and a low power per liter; comparatively speaking, although two-stroke engine has a simple structure and a high power per liter, it is very difficult to achieve good lubrication due to excessively large fuel consumption and environmental pollution as well as its own structure, causing its use range narrow.

In contrast, it has been suggested that an engine having a rotary piston mechanism can be used. For example, CN101403335A discloses an engine including a dual rotary piston mechanism. However, this engine is disadvantageous in terms of a small power-weight ratio, reciprocating motion existing in the valve mechanism, and eccentric rotation being prone to generate vibration, etc.

Different from the conventional reciprocating engine, a rotary engine directly converts the combustion expansion force of the combustible gas into driving torque, and thus the unnecessary rectilinear motion is cancelled. For example, the existing triangle rotary engine performs power stroke once every revolution of a spindle, and thus is advantageous in terms of a higher power per liter as compared to the general four-stroke engine which performs power stroke once every two revolutions of the spindle; moreover, the rotary engine can reach a higher operating speed without a precise crankshaft balancing due to its operating characteristics; additionally, the whole rotary engine only has two rotating parts, and thus has a considerably simplified structure with greatly reduced possibility of failure, as compared to the general four-stroke engine which has more than twenty moving parts such as intake valve, exhaust valve, or the like. In addition to the above advantages, the rotary engine is also advantageous in terms of a smaller volume, a light weight, a low center of gravity and a high power, etc.

In spite of that, the existing rotary engine still has the following drawbacks:

Firstly, although the rotary engine eliminates the impact occurred during the reciprocating motion of the piston, additional eccentric vibration is generated during operation of a rotor due to the eccentric structure thereof. In order to eliminate the eccentric vibration, a balance weight is required to be added which is vibrated in a direction opposite to the vibration direction of the rotor to reduce this vibration. Meanwhile, during the power stroke of the rotary engine, a local area of a cylinder block always suffers a huge impact, which causes a severe localized wear of the engine body, resulting in a non-uniform wear of the engine, thereby significantly reducing the lifespan of the engine.

Secondly, the rotor directly contacts with and drives the spindle to rotate the rotary engine while the rotor itself rotates eccentrically within the cylinder, behaving as a big gear fitted over an outer periphery of the spindle and moving eccentrically. The spindle journal is relatively small, causing a driving manner in which the big gear drives a small one such that the torque thereof is greatly reduced, which is also a main reason why the rotary engine is not widely available yet.

Thirdly, the rotary engine consumes a larger amount of fuel. It is mainly because the shape of the engine combustion chamber is adverse to complete combustion and the flame propagation path is longer, such that the fuel consumption and engine oil consumption are increased correspondingly. Moreover, the rotary engine has a low compression ratio due to its own structure, can only employ spark ignition but not compression ignition, and thus diesel oil can not be used.

In addition, since the adjacent cavities in the triangle rotary engine are sealed by a radial blade, the radial blade and the cylinder block undergo a trochoidal motion at an extremely high linear velocity during operation, which easily causes the radial blade worn quickly and generates tremulous ripples in the cylinder block, resulting in problems such as defective tightness, gas leak, or the like after the engine is used for a period of time, which in turn considerably increases the fuel consumption and pollution, thereby having an effect on the lifespan of the rotary engine as well.

To this end, although the existing rotary engine has many advantages as compared to the conventional rectilinear reciprocating engine, since the rotary engine has the above drawbacks, it is hard to use and popularize.

SUMMARY

An aspect of the exemplary embodiments is to provide a rotary engine which utilizes the driving torque applied to a rotor during the power stroke more effectively, has a higher power per liter and outputs the torque more smoothly, etc.

Another aspect of the exemplary embodiments is to provide an air-compressed rotary unit which can introduce an external gas, compress the introduced external gas and discharge the compressed gas.

Another aspect of the exemplary embodiments is to provide a power rotary unit which achieves power stroke and exhaust stroke through a reaction between the compressed gas and the fuel.

The exemplary embodiments provide a rotary engine in order to achieve the above inventive aspects. The rotary engine may include: an air-compressed rotary unit provided in an engine body, and a power rotary unit moving in coordination with the air-compressed rotary unit. The air-compressed rotary unit may include an outer rotor and an inner rotor provided eccentrically within the outer rotor, and be provided with an intake port for introducing an external gas and a gas-guide port for discharging a compressed gas, inner teeth constituted by a plurality of convex arc surfaces may be formed in an inner circumference of the outer rotor, outer teeth constituted by a plurality of concave arc surfaces may be formed in an outer circumference of the inner rotor, and a plurality of cavities independent of each other may be formed in such a manner that tops of every two adjacent outer teeth contact with corresponding arc surfaces of the inner teeth, whereby volumes of respective cavities change during the engagement and disengagement between the inner teeth and the outer teeth, and thus achieve intake stroke and compression stroke of the air-compressed rotary unit. The power rotary unit may include an outer rotor and an inner rotor provided eccentrically within the outer rotor, and be provided with a gas-supply port for introducing the compressed gas discharged from the air-compressed rotary unit, a fuel-supply device for supplying fuel and a exhaust port for discharging a burned gas, inner teeth constituted by a plurality of convex arc surfaces may be formed in an inner circumference of the outer rotor, outer teeth constituted by a plurality of concave arc surfaces may be formed in an outer circumference of the inner rotor, and a plurality of cavities independent of each other may be formed in such a manner that tops of every two adjacent outer teeth contact with corresponding arc surfaces of the inner teeth, whereby volumes of respective cavities change during the engagement and disengagement between the inner teeth and the outer teeth, and thus achieve power stroke and exhaust stroke of the power rotary unit. Thus it can be seen that, in the rotary engine according to the exemplary embodiments, intake stroke and pre-compression stroke are carried out by the air-compressed rotary unit, and strong compression stoke, power stroke and exhaust stroke are carried out by the power rotary unit. And, each cavity of respective rotary units performs respective strokes correspondingly during the rotation of the inner and outer rotors, that is, the inner rotor of each rotary unit may complete a number of strokes corresponding to the number of the cavities thereof for each revolution. Moreover, since the positions of the inner and outer rotors of each rotary unit are fixed relative to their own rotation axes, the inner and outer rotors of each rotary unit operates smoothly, such that the rotary engine according to the exemplary embodiments can generate a smooth output torque and greatly reduce the vibration.

In the rotary engine according to the exemplary embodiments, in order that the compressed gas provided by the air-compressed rotary unit is adapted to the compressed gas required for the power rotary unit, the power rotary unit may move in coordination with the air-compressed rotary unit at an angle difference in gas distribution. Specifically, the inner and outer rotors of the air-compressed rotary unit and the power rotary unit may be respectively connected with a power-output shaft provided in the engine body through a gear-driven mechanism at an angle difference in gas distribution, and the inner rotor of the air-compressed rotary unit may be rigidly connected with the inner rotor of the power rotary unit at an angle difference in gas distribution.

In the rotary engine according to the exemplary embodiments, in order to enhance the seal between tops of the outer teeth of the inner rotor and the corresponding arc surfaces of the inner teeth of the outer rotor and thus ensure an independent working efficiency of each cavity, a protrusion portion formed between every two adjacent concave arc surfaces of respective inner rotors may be provided with a blade. The blade may directly contact with the corresponding arc surfaces of the inner teeth of the outer rotor during the rotation of the inner rotor, and thus may be either provided in a radial direction of the inner rotor or provided elastically by means of an elastic part.

In the rotary engine according to the exemplary embodiments, the intake port and the gas-guide port of the air-compressed rotary unit may be provided on a hollow compressor shaft in the inner rotor of the air-compressed rotary unit respectively, and connected to an intake passage for introducing the external gas and a gas-guide passage for discharging the compressed gas provided in the hollow power shaft respectively, and an opening may be provided on each concave arc surface of the inner rotor of the air-compressed rotary unit, such that the opening may be communicated with the intake port and the gas-guide port respectively when the inner rotor of the air-compressed rotary unit rotates around the hollow compressor shaft. And, the intake port may be provided at the position where the volume of the cavity tends to change from being small to being large, such that the external gas may be introduced into the cavity via the intake port with the aid of pressure difference, and the gas-guide port may be provided at the position where the volume of the cavity tends to change from being large to being small, such that the gas in the cavity may be discharged via the gas-guide port after being compressed.

In the rotary engine according to the exemplary embodiments, the gas-supply port and the exhaust port of the power rotary unit may be provided on a hollow compressor shaft in the inner rotor of the power rotary unit respectively, and connected to a gas-supply passage for introducing the compressed gas and an exhaust passage for discharging the burned gas provided in the hollow power shaft respectively, and an opening may be provided on each concave arc surface of the inner rotor of the power rotary unit, such that the opening may be communicated with the gas-supply port and the exhaust port respectively when the inner rotor of the power rotary unit rotates around the hollow power shaft. And, the gas-supply port may be provided at the position where the volume of the cavity tends to the minimum, such that the compressed gas may be further compressed after being introduced into the cavity via the gas-supply passage, and the exhaust port may be provided at the position where the volume of the cavity tends to change from being large to being small, such that the burned gas in the cavity may be discharged via the exhaust port. In order that the burned gas under the action of the fuel expands towards the direction in which the volume of the cavity is gradually enlarged when the compressed gas in the cavity is compressed to tend to the maximum pressure, the fuel-supply device may be located at the position of the hollow power shaft close to the gas-supply port. The fuel-supply device may include a fuel-injection nozzle and may further include a spark plug, and thus may perform both a spark ignition and a compression ignition. In addition, a scavenging port may be provided at the position of the hollow power shaft adjacent to the exhaust port and connected with a scavenging passage provided in the hollow power shaft, such that the remaining burned gas may be discharged via the scavenging passage when the opening provided in the inner rotor is communicated with the scavenging port; and a scavenging period adjusting plate may be provided at the scavenging port, to adjust an amount of the gas discharged from the scavenging port in real time according to an operating speed of the power rotary unit.

According to another aspect of the exemplary embodiments, an air-compressed rotary unit provided in an engine body is provided. The air-compressed rotary unit may include an outer rotor and an inner rotor provided eccentrically within the outer rotor, and be provided with an intake port for introducing an external gas and a gas-guide port for discharging a compressed gas, inner teeth constituted by a plurality of convex arc surfaces may be formed in an inner circumference of the outer rotor, outer teeth constituted by a plurality of concave arc surfaces may be formed in an outer circumference of the inner rotor, and a plurality of cavities independent of each other may be formed in such a manner that tops of every two adjacent outer teeth contact with corresponding arc surfaces of the inner teeth, whereby volumes of respective cavities change during the engagement and disengagement between the inner teeth and the outer teeth, and thus achieve intake, compression and exhaust processes of the air-compressed rotary unit.

According to another aspect of the exemplary embodiments, a power rotary unit provided in an engine body is provided. The power rotary unit may include an outer rotor and an inner rotor provided eccentrically within the outer rotor, and be provided with a gas-supply port for introducing a compressed gas, a fuel-supply device for supplying fuel and a exhaust port for discharging a burned gas, inner teeth constituted by a plurality of convex arc surfaces may be formed in an inner circumference of the outer rotor, outer teeth constituted by a plurality of concave arc surfaces may be formed in an outer circumference of the inner rotor, and a plurality of cavities independent of each other may be formed in such a manner that tops of every two adjacent outer teeth contact with corresponding arc surfaces of the inner teeth, whereby volumes of respective cavities change during the engagement and disengagement between the inner teeth and the outer teeth, and thus achieve power and exhaust of the power rotary unit.

According to another aspect of the exemplary embodiments, a rotary engine is provided. The rotary engine may include at least one power rotary unit provided in an engine body and a gas-supply unit adapted to the power rotary unit and supplying a compressed gas; the power rotary unit may include an outer rotor and an inner rotor provided eccentrically within the outer rotor, and be provided with a gas-supply port for introducing the compressed gas, a fuel-supply device for supplying fuel and a exhaust port for discharging a burned gas; inner teeth constituted by a plurality of convex arc surfaces may be formed in an inner circumference of the outer rotor, outer teeth constituted by a plurality of concave arc surfaces may be formed in an outer circumference of the inner rotor, and a plurality of cavities independent of each other may be formed in such a manner that tops of every two adjacent outer teeth contact with corresponding arc surfaces of the inner teeth, whereby volumes of respective cavities change during the engagement and disengagement between the inner teeth and the outer teeth, and thus achieve power stroke and exhaust stroke of the power rotary unit.

The rotary engine according to the exemplary embodiments may be advantageous in terms of a simple structure, a long lifespan, a small vibration, a large power-weight ratio, a high power per liter, a high output torque and suitable for various fuel, etc, and thus can be widely used in various fields such as transportation, power machinery, or the like.

BRIEF DESCRIPTION OF THE DRAWINGS

These and/or other aspects and utility of the disclosure will become apparent and more readily appreciated from the following description of exemplary embodiments, taken in conjunction with the accompanying drawings of which:

FIG. 8A to FIG. 8G are schematic views illustrating a process in which the air-compressed rotary unit and corresponding power rotary unit of the rotary engine work.

DETAILED DESCRIPTION OF EXEMPLARY EMBODIMENTS

Reference will now be made in detail to exemplary embodiments, examples of which are illustrated in the accompanying drawings. Hereinafter, the exemplary embodiments will be described with reference to the accompanying drawings to explain the general inventive concept.

Figure 1:
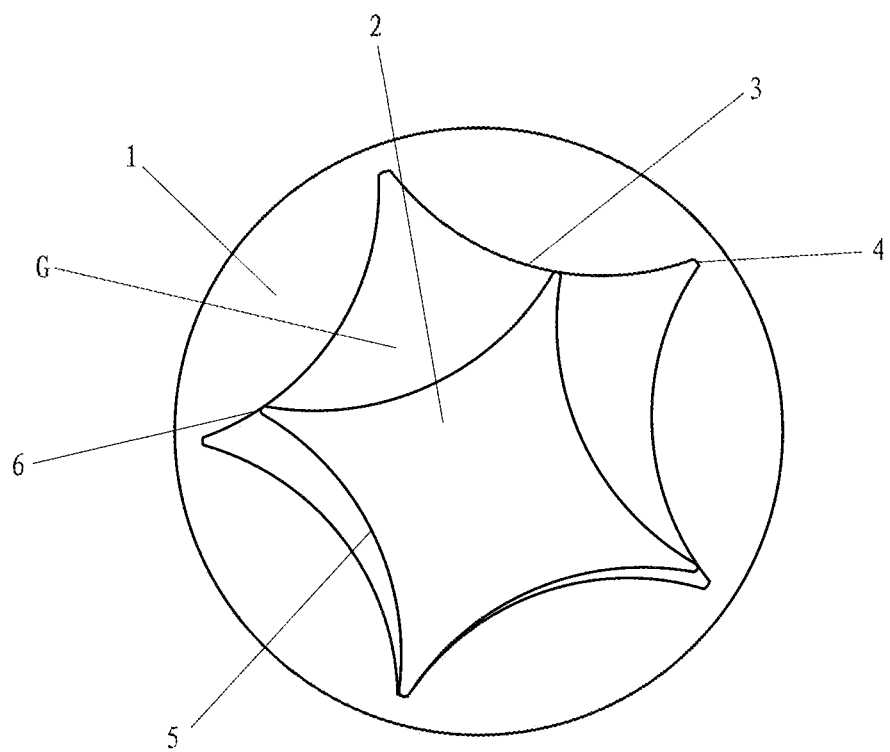
FIG. 1 is a schematic view illustrating the operating principle of a rotary unit.

FIG. 1 illustrates the operating principle of the rotary unit according to an exemplary embodiment.

Referring to FIG. 1, the air-compressed rotary unit and the power rotary unit according to an exemplary embodiment have substantially the same shapes and operating principles. The air-compressed rotary unit and the power rotary unit each includes an outer rotor (1) and an inner rotor (2) eccentrically provided inside the outer rotor (1). Inner teeth (4) constituted by a plurality of convex arc surface (3) are formed in an inner circumference of the outer rotor (1), and outer teeth (6) constituted by a plurality of concave arc surface (5) are formed in an outer circumference of the inner rotor (2). A plurality of cavities (G) independent of each other are formed in such a manner that tops of every two adjacent outer teeth (6) contact with the corresponding arc surfaces of the inner teeth (4), thereby the volumes of the above-described respective cavities (G) change during the engagement and disengagement between the inner teeth (4) and the outer teeth (6), and thus achieve intake stroke, compression stroke and exhaust stroke of the air-compressed rotary unit. The power rotary unit further compresses the compressed gas introduced from the air-compressed rotary unit to perform power stroke and exhaust stroke.

Specifically, the outer rotor (1) rotates as the inner rotor (2) rotates, and each tooth of the inner rotor (2) can always form line contact on the tooth profile lines of the outer rotor (1) at any rotation angle thereof due to the tooth shapes of the inner rotor (2) and the outer rotor (1), and thus the plurality of cavities (G) are formed between the inner rotor (2) and the outer rotor (1). Volume of each cavity repeatedly varies with the rotary motion of the inner rotor and the outer rotor, thereby achieving the corresponding operation processes of respective rotary units.

In the exemplary rotary unit as shown in FIG. 1, intake and exhaust may be achieved by a hollow shaft (not shown in FIG. 1) provided in the inner rotor. The outer rotor (1) has five inner teeth (4) constituted by five convex arc surface (3), the inner rotor (2) has four outer teeth (6) constituted by four concave arc surface (5), and the outer teeth (6) of the inner rotor always contact with an inner wall (i.e., convex arc surface) of the outer rotor during the coordinated motion between the outer rotor and the inner rotor, thereby dividing the rotary unit into four cavities (G) independent of each other. In another exemplary embodiment, the outer rotor may have more inner teeth, and the inner rotor may also have more outer teeth. In other exemplary embodiments, the outer rotor may have less inner teeth, and the inner rotor may also have less outer teeth.

Figure 2:
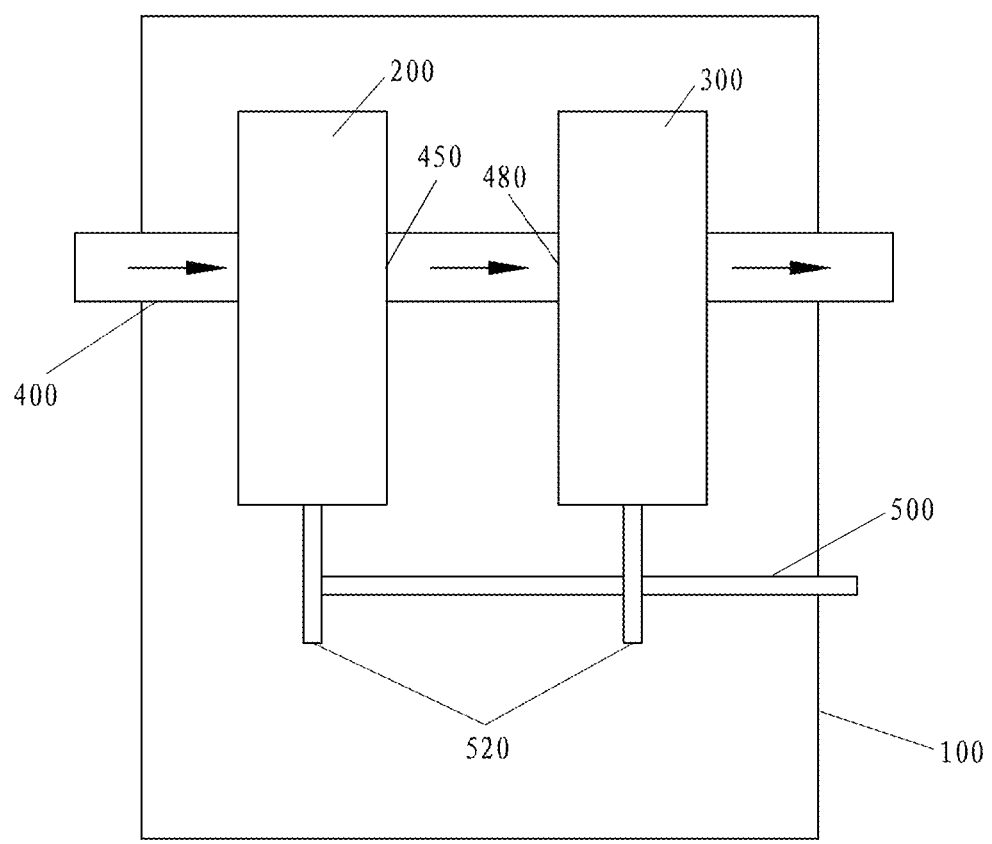
FIG. 2 is a schematic view illustrating the operating principle of a rotary engine.

FIG. 2 illustrates the operating principle of the rotary engine according to an exemplary embodiment.

Referring to FIG. 2, the rotary engine according to an exemplary embodiment includes a plurality of rotary units arranged in series. In particular, one air-compressed rotary unit (200) and one power rotary unit (300) are included in the rotary engine body (100), wherein the air-compressed rotary unit and the power rotary unit have the same structure and operating principle as the rotary unit shown in FIG. 1. In the rotary engine according to an exemplary embodiment, the introduced gas firstly enters into the air-compressed rotary unit (200) so as to be preliminarily compressed, the preliminarily compressed gas passes through a gas-guide port (450) of the air-compressed rotary unit and enters into the power rotary unit (300) via a gas-supply port (480) of the power rotary unit so as to be further compressed. When the volume of the gas is compressed to tend to the minimum volume, power stroke is carried out through spark ignition or compression ignition to generate power. The generated power is delivered out through a power-output device (500), which moves in coordination with the air-compressed rotary unit (200) and the power rotary unit (300) via synchromesh gears (520).

In another exemplary embodiment, the rotary engine may include a plurality of rotary unit sets in parallel, and each rotary unit set consists of the air-compressed rotary unit and the power rotary unit. Alternatively, in another exemplary embodiment, the rotary engine may include one air-compressed rotary unit and a plurality of power rotary units, and the air-compressed rotary unit delivers the preliminarily compressed gas into the plurality of power rotary units in parallel, so as to generate more power output. Alternatively, in other exemplary embodiments, the rotary engine may only include one or more power rotary units, the preliminarily compressed gas is provided to the power rotary units by an air compressor or other suitable devices which can supply compressed gas. Thus it can be seen that, in the case when the rotary engine according to an exemplary embodiment includes a plurality of power rotary units, the rotary engine has a plurality of cavities, in which intake, compression, power and exhaust processes are carried out independently of each other. Therefore, the power-weight ratio, power per liter and output torque can be increased.

Hereinafter, one exemplary embodiment will be described in detail with reference to FIGS. 3-8G.

As shown in FIGS. 3-6, the rotary engine according to the present exemplary embodiment includes: engine body (100), enclosing the air-compressed rotary unit (200), the power rotary unit (300), a gas-supply device (400) for gas delivery and the power-output device (500) provided within the air-compressed rotary unit (200) and the power rotary unit (300), the engine body (100) forming an external appearance of the rotary engine and including an air-compressed body end cover (110), a power body end cover (120) and a main body connected to the air-compressed body end cover (110) and the power body end cover (120); the air-compressed rotary unit (200) to introduce gas from the outside and preliminarily compress the introduced gas; the power rotary unit (300) to introduce the preliminarily compressed gas from the air-compressed rotary unit (200), further compress the gas and perform power stroke; the gas-supply device (400) to introduce the gas into the air-compressed rotary unit (200) from the outside, introduce the gas preliminarily compressed in the air-compressed rotary unit (200) into the power rotary unit (300), and finally discharge the exhaust gas in the power rotary unit (300) out of the rotary engine; the power-output device (500) outputting the power generated from the rotary engine and including a power-output shaft (510) and the synchromesh gears (520, 530, 540).

Figure 3:
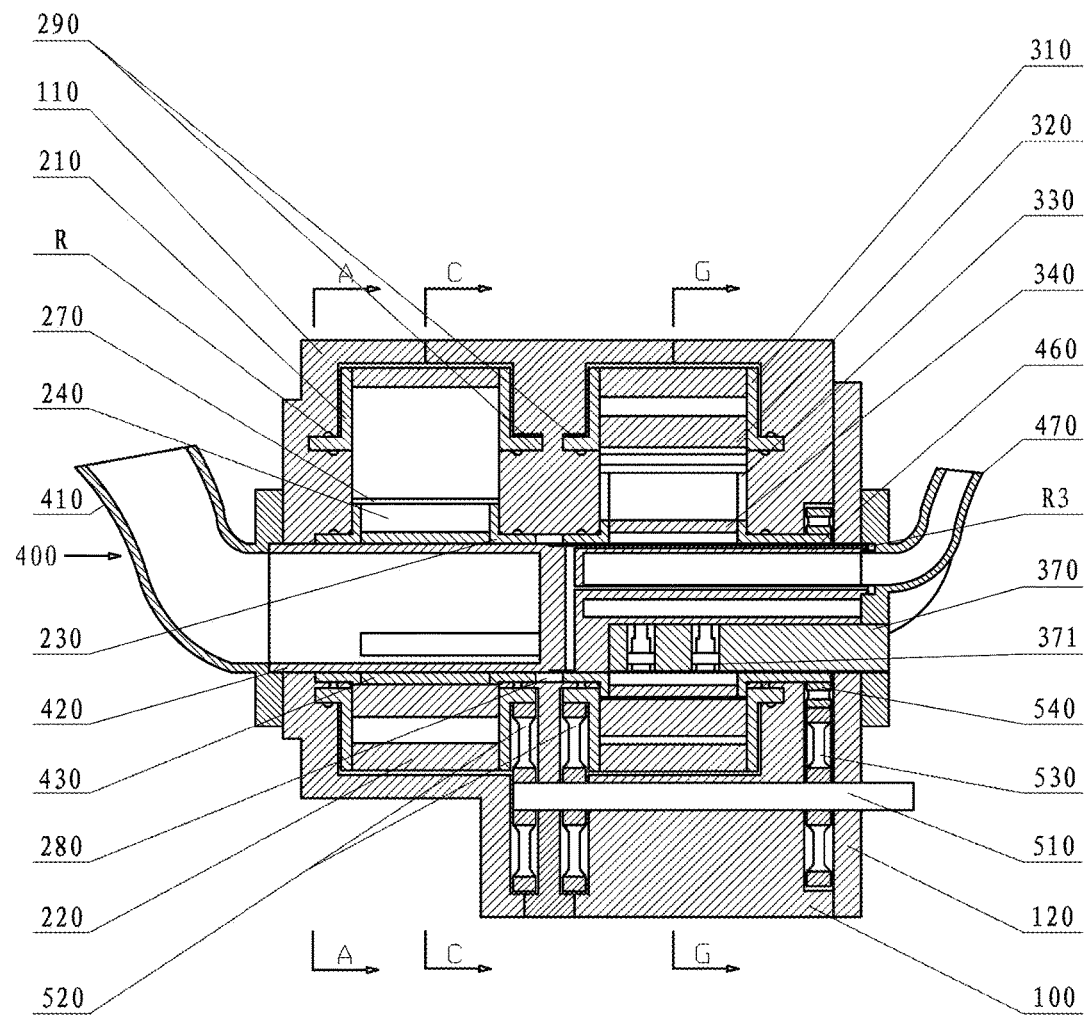
FIG. 3 is a schematic sectional view of overall structure of the rotary engine according to an exemplary embodiment.
Figure 4:
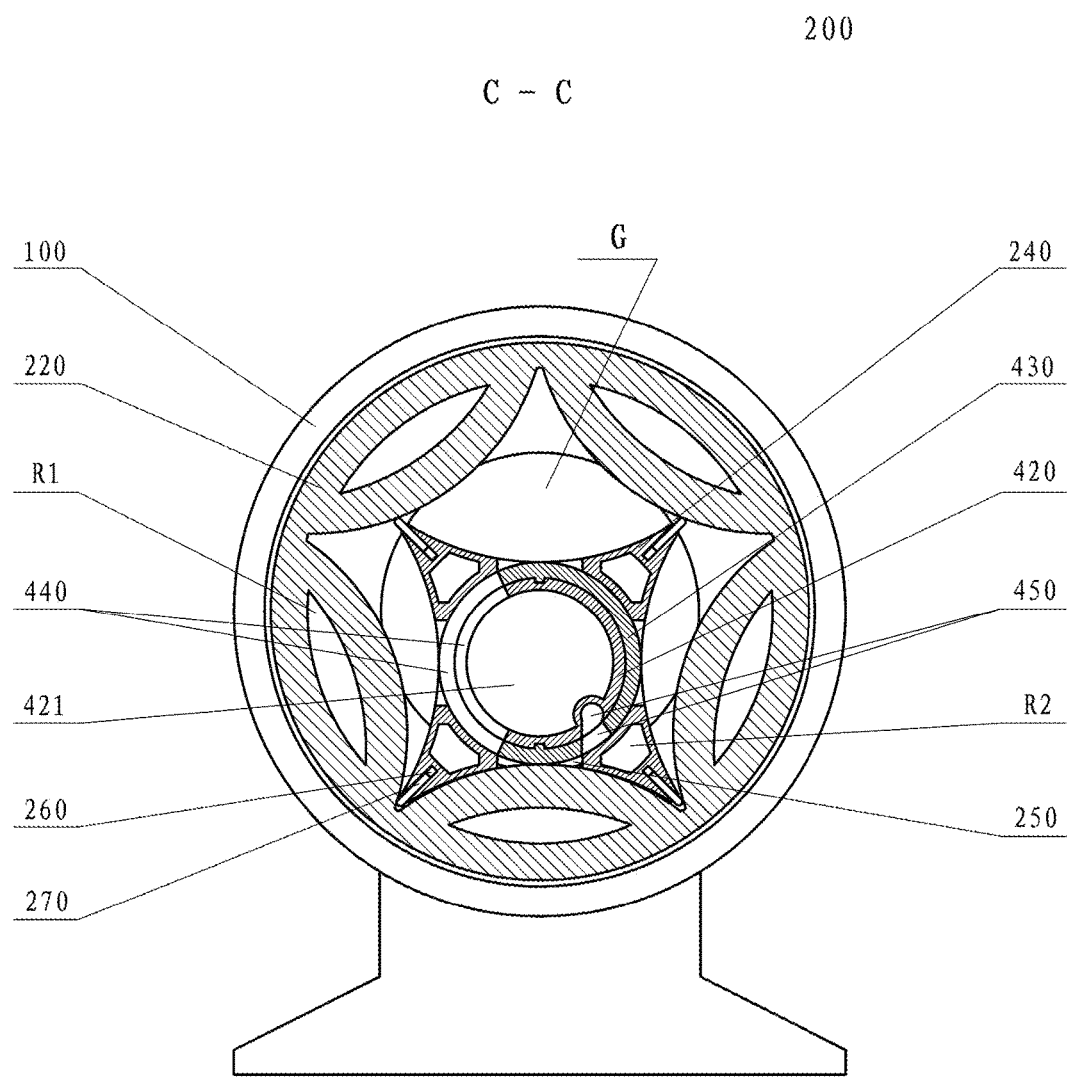
FIG. 4 is a schematic sectional view taken along line C-C in FIG. 3.

As shown in FIG. 3 and FIG. 4, the air-compressed rotary unit (200) includes: an air-compressed outer rotor end cover (210) rigidly connected to an air-compressed outer rotor (220) and rotated along with the rotation of the air-compressed outer rotor (220), a ring gear (290) being provided on one side close to the power rotary unit outside of the air-compressed outer rotor end cover (210), for engaging with the synchromesh gears (520) to rotate the two rotary units together at the same speed and at an angle difference; the air-compressed outer rotor (220) having a cylindrical shape from the outside, when viewed in a cross section, the air-compressed outer rotor (220) having a pentagon-like cavity inside, each side of the pentagon-like cavity having an arc shape protruded inward, preferably, each convex arc surface and an outer wall of the air-compressed outer rotor (220) having a fusiform cavity therebetween, a cooling and lubricating fluid being filled in the fusiform cavity, that is, forming a cooling and lubricating fluid channel R1; an air-compressed inner rotor end cover (230) rigidly connected to an air-compressed inner rotor (240), and rigidly connected with a power inner rotor end cover (330) by means of a spline (280); and the air-compressed inner rotor (240) having a different axis from that of the air-compressed outer rotor (220), that is, being not coaxial with the air-compressed outer rotor (220), wherein an overall shape of the air-compressed inner rotor is a quadrilateral body each side of which is recessed inward, and each side of the quadrilateral body has a smaller curvature than that of each arc side protruded inward of the air-compressed outer rotor.

The air-compressed inner rotor (240) is provided with grooves (260) at four corners thereof, and radial blades (270) are provided in the grooves (260) to seal the cavities (G) between the air-compressed inner rotor (240) and the air-compressed outer rotor (220). The radial blade (270) may be supported by an elastic member such as a spring, so as to extend and retract radially as the air-compressed inner rotor (240) rotates. In this exemplary embodiment, there are four cavities existing between the air-compressed inner rotor (240) and the air-compressed outer rotor (220) of air-compressed rotary unit, and the volume of each cavity varies with the rotation of the air-compressed inner rotor (240) and the air-compressed outer rotor (220) to introduce or compress the gas. In another exemplary embodiment, the shapes of the air-compressed outer rotor (220) and the air-compressed inner rotor (240) are not limited thereto, and the cross sections thereof may be in the form of various polygons and there may be more cavities existing between the air-compressed outer rotor (220) and the air-compressed inner rotor (240). Preferably, in this exemplary embodiment, four or more cooling and lubricating fluid channels R2 for the inner rotor may be provided at positions of the air-compressed inner rotor (240) closer to the center than the grooves.

The air-compressed rotary unit (200) also includes openings (250, also referred to as "intake duct of the inner rotor" in this exemplary embodiment). In this exemplary embodiment, intake ducts of the inner rotor (250) are provided in the middle of the four concave arc surfaces of the air-compressed inner rotor (240), respectively. When there are more cavities, each cavity has a corresponding intake duct of the inner rotor, when the intake duct is communicated with an intake port (440, also referred to as "intake duct of intake distribution pipe" in this exemplary embodiment), the gas in a hollow compressor shaft (420, also referred to as "intake distribution pipe" in this exemplary embodiment) may be introduced into the cavity (G), and when the intake duct is communicated with the gas-guide port (450, also referred to as "compressed gas exhaust hole" in this exemplary embodiment), the preliminarily compressed gas is introduced into the compressed gas exhaust hole (450), and thus introduced into the power rotary unit.

In addition, the air-compressed rotary unit (200) may be used as an individual rotary unit. Specifically, the air-compressed rotary unit (200) may be used individually as a gas compression pump.

Figure 5:
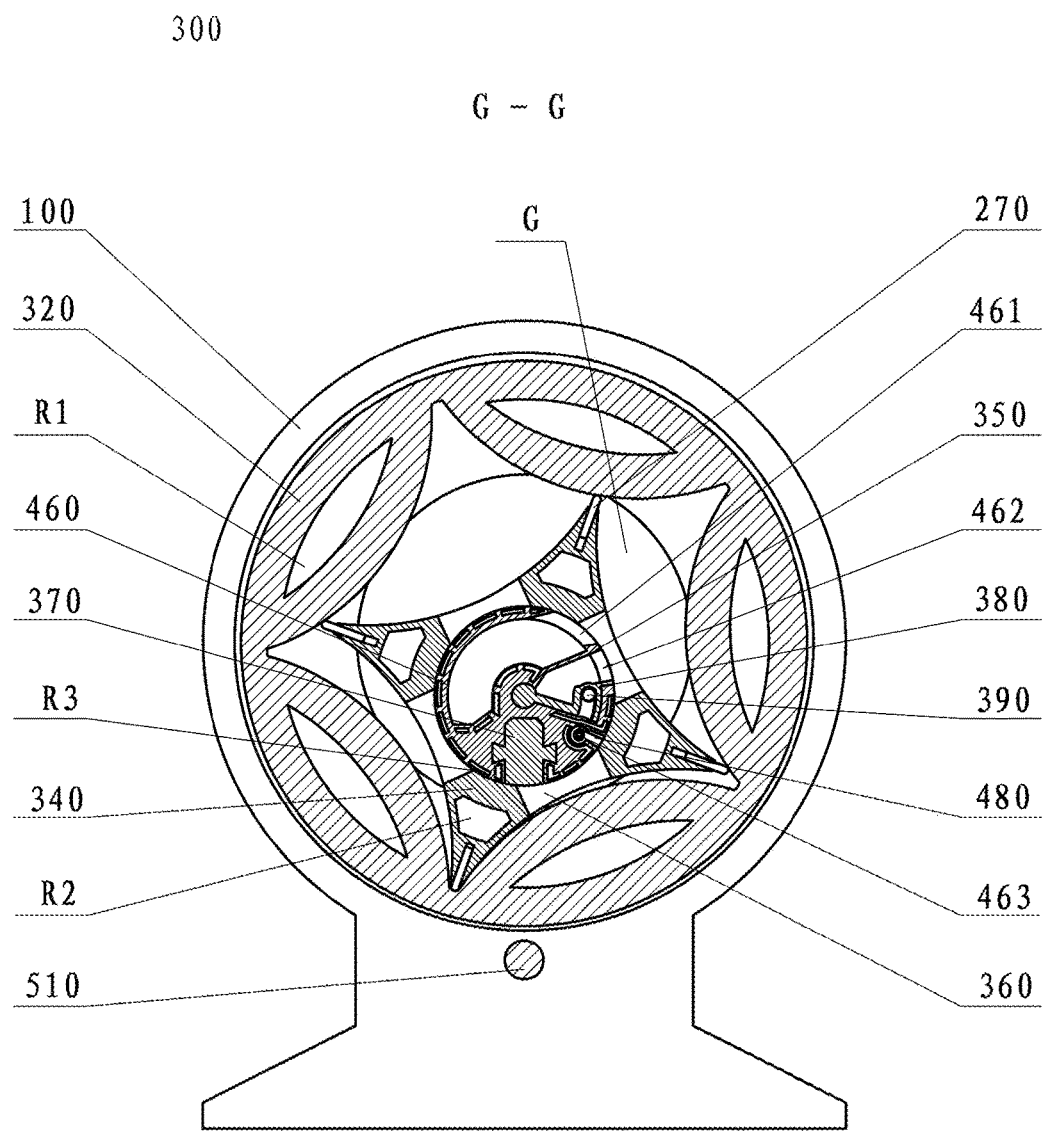
FIG. 5 is a schematic sectional view taken along line G-G in FIG. 3.
Figure 6:
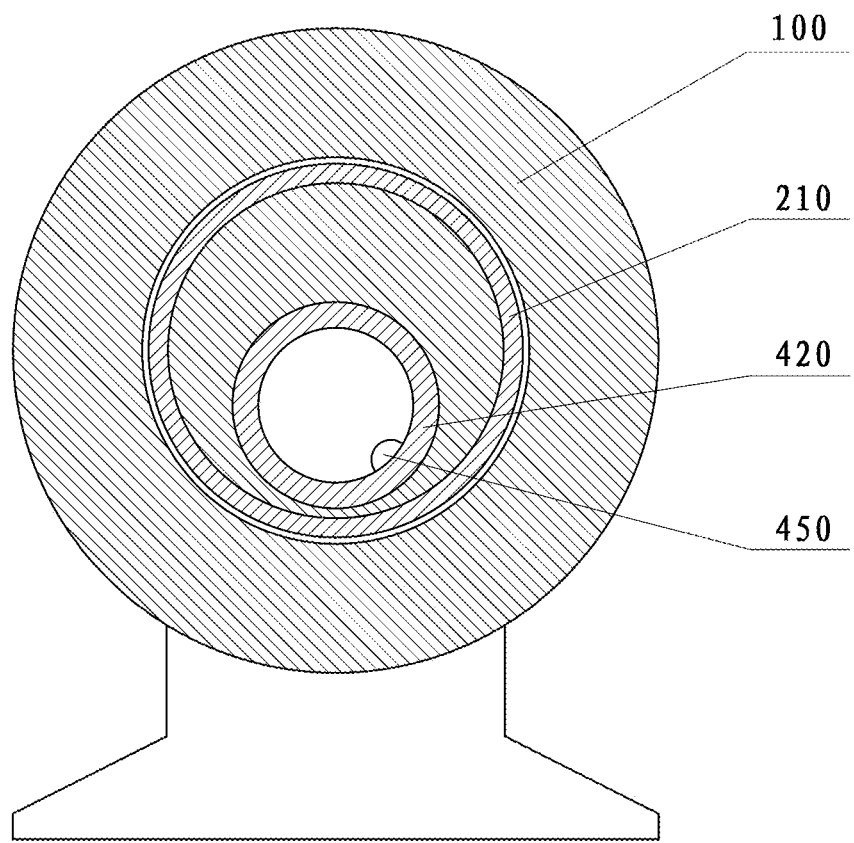
FIG. 6 is a schematic sectional view taken along line A-A in FIG. 3.

As shown in FIG. 3 and FIG. 5, the power rotary unit (300) includes: an power outer rotor end cover (310) rigidly connected to an power outer rotor (320) and rotated along with the rotation of the power outer rotor (320), a ring gear (290) being provided on one side close to the air-compressed outer rotor end cover (210) outside of the power outer rotor end cover (310), for engaging with the synchromesh gears (520) to rotate the two rotary units at the same speed; the power outer rotor (320) having a cylindrical shape from the outside, which is similar to the shape of the air-compressed outer rotor (220), when viewed in a cross section, the power outer rotor (320) having a pentagon-like cavity inside, each side of the pentagon-like cavity having an arc shape protruded inward, preferably, each convex arc surface and an outer wall of the power outer rotor (320) having a fusiform cavity therebetween, a cooling and lubricating fluid being filled in the fusiform cavity, that is, forming a cooling and lubricating fluid channel R1; an power inner rotor end cover (330) rigidly connected to an power inner rotor (340); and the power inner rotor (340) having a different axis from that of the power outer rotor (320), that is, being not coaxial with the power outer rotor (320), wherein an overall shape of the power inner rotor (340) is a quadrilateral body each side of which is recessed inward, which is substantially the same as the overall shape of the air-compressed inner rotor (240), and each side of the quadrilateral body has a smaller curvature than that of each arc side protruded inward of the power outer rotor.

In the present exemplary embodiment, the power inner rotor (340) is provided with grooves at four corners thereof, and radial blades (270) are provided in the grooves to seal the cavities (G) between the power inner rotor (340) and the power outer rotor (320). The radial blade (270) may be supported by an elastic member such as a spring, so as to extend and retract radially as the power inner rotor (340) rotates. In this exemplary embodiment, there are four cavities existing between the power inner rotor (340) and the power outer rotor (320) of power rotary unit, and the volume of each cavity varies with the rotation of the power inner rotor (340) and the power outer rotor (320) to compress the gas or ignite the compressed gas for power stroke. In another exemplary embodiment, the shapes of the power outer rotor (320) and the power inner rotor (340) are not limited thereto, and the cross sections thereof may be in the form of various polygons and there may be more cavities existing between the power outer rotor (320) and the power inner rotor (340). Preferably, in this exemplary embodiment, four or more cooling and lubricating fluid channels R2 for the inner rotor may be provided at positions of the power outer rotor (320) closer to the center than the grooves.

Figure 7:
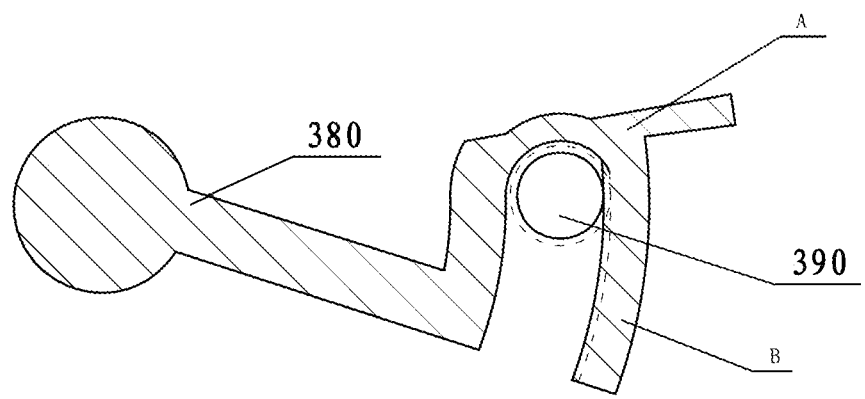
FIG. 7 is a schematic sectional view of a scavenging period adjusting plate and a scavenging period adjusting shaft assembled with the scavenging period adjusting plate.

The power rotary unit (300) also includes: openings (360, also referred to as "intake/exhaust hole of the rotor" in this exemplary embodiment), provided in the middle of the four concave arc surfaces of the power inner rotor (340) respectively, wherein, when there are more cavities, each cavity (G) has a corresponding intake/exhaust hole of the rotor (360), when the intake/exhaust hole is communicated with the gas-supply port (480, also referred to as "compressed gas intake hole" in this exemplary embodiment), the gas preliminarily compressed in the air-compressed rotary unit is introduced into the cavity (G) of the power rotary unit, when the intake/exhaust hole is communicated with an exhaust port (also referred to as "main exhaust hole" (461) in this exemplary embodiment and adjacent to a scavenging hole (462)), the burned gas is discharged into a corresponding exhaust passage in a hollow power shaft (460, also referred to as "power distribution pipe" in this exemplary embodiment), and when the arc surface of the power inner rotor coincides with the arc surface of the power outer rotor, that is, when the volume of the gas in the cavity is compressed to the minimum volume, the intake/exhaust hole of the rotor (360) forms the combustion chamber; a spark plug mounting module (370) inserted into the power distribution pipe (460) axially, wherein, when viewed in a cross section, the spark plug mounting module (370) has two dovetail-groove structures on both sides thereof, thereby improving the strength of the power distribution pipe (460), and a spark plug (371) may be mounted on the spark plug mounting module (370), so that the spark plug (371) can be disassembled and replaced conveniently; a scavenging period adjusting plate (380) inserted into the power distribution pipe (460) axially, in this exemplary embodiment, as shown in FIG. 7, a body of the scavenging period adjusting plate (380) is approximately L-shaped, a portion A extends from an end of a short side of the L shape in a direction opposite to a long side of the L shape, an arc portion B extends from the extended portion A in a direction opposite to the short side of the L shape, a gear rack is provided inside of the arc portion B, that is, the gear rack is provided at one side of the arc portion B facing the scavenging period adjusting plate (380), the arc portion B has the same curvature as that of the power distribution pipe (460), such that the scavenging period adjusting plate (380) can mate closely with the power distribution pipe (460), the scavenging period adjusting plate (380) may rotate around an axis of the power distribution pipe (460) so as to adjust the size of the scavenging hole (462), in this way, short circuit losses resulting from scavenging when the mixed gas enters into the cavity (G) can be minimized; a scavenging period adjusting shaft (390) inserted into the power distribution pipe (460) axially and having teeth in an outer circumference thereof, wherein the scavenging period adjusting plate (380) moves circumferentially under the cooperation of the teeth with the gear rack on the scavenging period adjusting plate (380) so as to adjust the size of the scavenging hole (462), the scavenging period adjusting shaft (390) may be rotated by means of a driving motor, and in another exemplary embodiment, the scavenging period adjusting shaft (390) may be omitted and the scavenging period adjusting plate (380) may be driven by a hydraulic mechanism; and an exhaust partition (350) provided in the power distribution pipe (460) and dividing the power distribution pipe (460) into the exhaust port (461) for discharging the exhaust gas and the scavenging port (i.e., scavenging hole (462)) as shown in FIG. 5, to prevent an interference between the adjacent cavities during power and exhaust strokes, in another exemplary embodiment, the exhaust partition (350) may also be integrally formed with the power distribution pipe (460).

In addition, the power rotary unit (300) may also be used as an individual rotary unit.

Specifically, the gas compressed by other compression devices may be introduced into the cavity in the power rotary unit (300) via the compressed gas intake hole (480) in the power rotary unit (300), and then the power stroke is carried out by using the power rotary unit (300), thereby achieving compression and power strokes by using only one rotary unit.

As shown in FIGS. 3-5, in this exemplary embodiment, the gas-supply device (400) is not an individual member, but distributed in the air-compressed rotary unit (200) and the power rotary unit (300). In general, the gas-supply device (400) includes: a gas inlet (410) used to introduce an external gas and connected to the intake distribution pipe (420); the intake distribution pipe (420) provided in the air-compressed inner rotor (240) and communicated with the gas inlet (410) through an intake passage (421), wherein the intake distribution pipe (420) is fixed relative to the engine body (100), coaxial with the air-compressed inner rotor (240) and provided with a recessed portion thereon; an intake distribution pipe casing (430) fitted over the intake distribution pipe (420) and rigidly connected to the intake distribution pipe (420) for example by a spline, to reduce a cross-sectional area of the intake duct of the inner rotor (250) such that more gas is discharged into the power rotary unit, wherein, a notch is provided in the intake distribution pipe casing (430) and forms the intake duct of intake distribution pipe (440) together with the recessed portion on the intake distribution pipe (420), the intake duct of intake distribution pipe (440) has such a width that the intake duct of intake distribution pipe (440) may be communicated with at most two intake ducts of the inner rotor (250) at the same time, and the intake duct of intake distribution pipe (440) is usually provided at the position where the volume of the cavity tends to change from being small to being large, such that the external gas can be introduced into the cavity via the intake duct of intake distribution pipe (440) with the aid of pressure difference; the compressed gas exhaust hole (450) which is a gas-guide passage constituted by the recessed portion on the intake distribution pipe (420) and the notch in the intake distribution pipe casing (430) and used to deliver the gas preliminarily compressed in the air-compressed rotary unit to the power rotary unit, wherein the compressed gas exhaust hole (450) is usually provided at the position where the volume of the cavity tends to change from being large to being small, such that the gas in the cavity can be discharged via the compressed gas exhaust hole (450) after being compressed.

The gas-supply device (400) also includes: the power distribution pipe (460) provided in the power inner rotor (340), fixed to the power body end cover (120) at one end thereof and rigidly connected to the intake distribution pipe (420) at the other end thereof, and being coaxial with the power inner rotor (340), wherein, the power distribution pipe (460) is provided with an exhaust pipe (470) at the end thereof and provided with a plurality of cooling and lubricating fluid channels R3 inside thereof, an upper portion of the power distribution pipe (460) is hollow for gas delivery, and provided with the main exhaust hole (461) and the scavenging hole (462) to discharge the exhaust gas in the cavity into the power distribution pipe (460), and the spark plug mounting module (370), a fuel-injection nozzle (463), the scavenging period adjusting plate (380) and the scavenging period adjusting shaft (390) are provided axially at a lower portion of the power distribution pipe (460); the exhaust pipe (470) connected with the power distribution pipe (460) to discharge the exhaust gas in the power distribution pipe (460) out of the rotary engine; the compressed gas intake hole (480) provided on the power distribution pipe (460) axially, in detail, the compressed gas intake hole (480) is a groove recessed from the power distribution pipe (460), adjacent to the fuel-injection nozzle (463), and always communicated with the compressed gas exhaust hole (450) in the intake distribution pipe casing (430) and the intake distribution pipe (420), to guide the gas preliminarily compressed in the air-compressed rotary unit to the cavity of the power inner rotor (340), the compressed gas intake hole (480) is usually provided at the position where the volume of the cavity tends to the minimum, such that the compressed gas is further compressed after being introduced into the cavity via a gas-supply passage, and the exhaust port (461) is provided at the position where the volume of the cavity tends to change from being large to being small, such that the burned gas in the cavity is discharged via the exhaust port (461).

As shown in FIGS. 3-5, the power-output device (500) includes: the power-output shaft (510) provided below the air-compressed rotary unit (200) and the power rotary unit (300) to output power generated from the rotary engine; the synchromesh gears (520, 530, 540) to deliver the power generated from the power rotary unit to the power-output shaft (510). The ring gear (290) on the air-compressed outer rotor end cover (210) and the ring gear (290) on the power outer rotor end cover (310) respectively engage with the synchromesh gears (520) provided on the power-output shaft (510) at a gear ratio, and the synchromesh gear (540) on the power inner rotor end cover (330) also engages with the synchromesh gear (530) on the power-output shaft (510), such that wear between the air-compressed inner rotor (240) and the air-compressed outer rotor (220) and between the power inner rotor (340) and the power outer rotor (320) may be reduced.

Hereinafter, the operating principle and the operating process of the rotary engine will be described in detail with reference to FIGS. 3-8G.

When the rotary engine starts to operate, the external gas is introduced into the air-compressed rotary unit (200) from the gas inlet (410) via the intake distribution pipe (420).

As the air-compressed inner rotor (240) and the air-compressed outer rotor (220) rotate for example in the clockwise direction, the gas in the intake distribution pipe (420) enters into the cavity G (taking the left cavity as shown in FIG. 4 as an example) of the air-compressed rotary unit through the intake duct of intake distribution pipe (440) and the intake duct of the inner rotor (250). That is to say, as the air-compressed inner rotor (240) rotates, when the intake duct of intake distribution pipe (440) is communicated with the intake duct of the inner rotor (250), the left cavity G of the air-compressed rotary unit is communicated with the intake passage (421) and the gas enters into the left cavity G of the air-compressed rotary unit communicated therewith. According to the operating principle of the existing rotary engine, the volume of the left cavity G of the air-compressed rotary unit may be further increased, the corresponding intake duct of the inner rotor (250) may be further communicated with the intake duct of intake distribution pipe (440), and the cavity G may be further in the intake state. At this time, as shown in FIG. 4, the upper cavity G reaches its maximum volume, the corresponding intake duct of the inner rotor (250) is not communicated with the intake duct of intake distribution pipe (440); the right cavity G is in a compression state at this time, the corresponding intake duct of the inner rotor (250) is not communicated with the intake duct of intake distribution pipe (440) either; and the lower cavity G reaches its minimum volume, the lowermost arc surface of the air-compressed inner rotor coincides with the lowermost arc surface of the air-compressed outer rotor, that is, gas in this cavity is preliminarily compressed to the minimum volume, and the corresponding intake duct of the inner rotor (250) is not communicated with the intake duct of intake distribution pipe (440) either. As the air-compressed inner rotor (240) and the air-compressed outer rotor (220) continue to rotate, gas within the left cavity G is compressed, and the upper cavity G rotates to the right at this time, when the corresponding intake duct of the inner rotor (250) of the upper cavity G is communicated with the compressed gas exhaust hole (450), the gas preliminarily compressed in the air-compressed rotary unit is discharged out of the air-compressed rotary unit through the compressed gas exhaust hole (450). As the air-compressed inner rotor and the air-compressed outer rotor continue to rotate, the right cavity G rotates to the bottom, most of the gas in the right cavity G is discharged, and at this time, the corresponding intake duct of the inner rotor (250) of the right cavity G is not communicated with the compressed gas exhaust hole (450), that is, the intake duct of the inner rotor (250) of the right cavity G is closed by the air-compressed inner rotor.

Figure 8A:
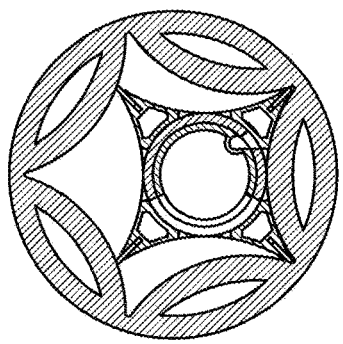
Figure 8A:
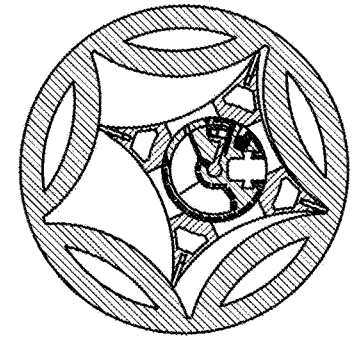
Figure 8B:
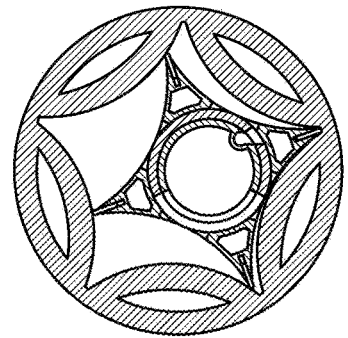
Figure 8B:
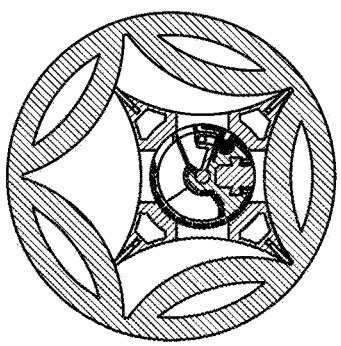
Figure 8C:
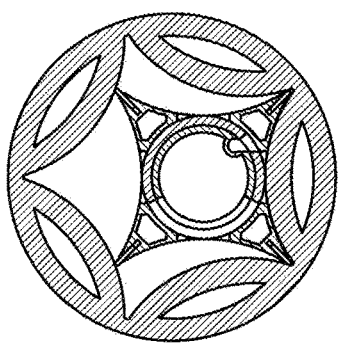
Figure 8C:
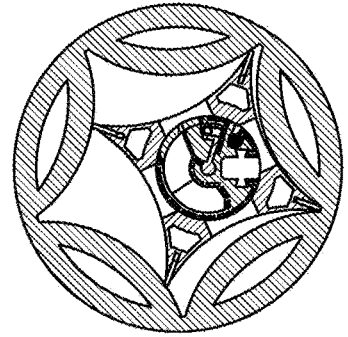
Figure 8D:
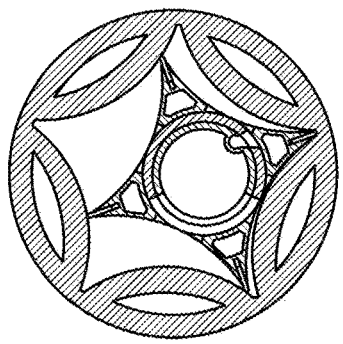
Figure 8D:
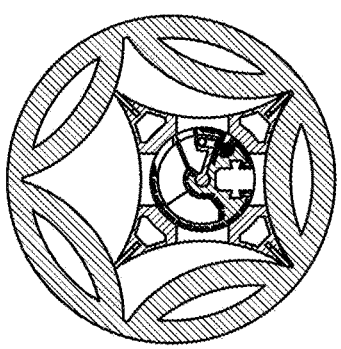

As shown in FIGS. 8A-8G, the operating process of one cavity in the air-compressed rotary unit will be described by taking the lowermost cavity G in FIG. 4 as an example. At this time, as shown in FIG. 8A, the corresponding intake duct of the inner rotor (250) of this cavity G is neither communicated with the intake duct of intake distribution pipe (440), nor be it communicated with the compressed gas exhaust hole (450), the present cavity G is in its minimum volume, and the gas in the cavity G is substantially discharged into the power rotary unit. When the air-compressed inner rotor and the air-compressed outer rotor rotate, the corresponding intake duct of the inner rotor (250) of this cavity G is communicated with the intake duct of intake distribution pipe (440), and the external gas enters into the cavity G via the intake duct of intake distribution pipe (440) and the intake duct of the inner rotor (250) through the intake distribution pipe (420). As the air-compressed inner rotor and the air-compressed outer rotor further rotate, the volume of this cavity G becomes lager, more and more external gas enters into the cavity G, and at this time, the corresponding intake duct of the inner rotor (250) of this cavity G is always communicated with the intake duct of intake distribution pipe (440), as shown in FIG. 8B. As shown in FIG. 8C, when this cavity G arrives at the top, this cavity G reaches its maximum volume, and the intake duct of the inner rotor (250) is not communicated with the intake duct of intake distribution pipe (440). When the air-compressed inner rotor and the air-compressed outer rotor further rotate, the volume of this cavity G begins to reduce, and the gas within the cavity G begins to be compressed, as shown in FIGS. 8D and 8E. When the corresponding intake duct of the inner rotor (250) of this cavity G is communicated with the compressed gas exhaust hole (450), the gas begins to be discharged through the compressed gas exhaust hole (450), that is, the gas preliminarily compressed in the cavity G is discharged to the power rotary unit through the compressed gas exhaust hole (450), as shown in FIGS. 8F and 8G. When the arc surfaces defining this cavity G of the air-compressed inner rotor and the air-compressed outer rotor coincide with each other, the corresponding intake duct of the inner rotor (250) of this cavity G is not communicated with the compressed gas exhaust hole (450), the gas in this cavity G is substantially completely discharged, at this time, the cavity G is in a state in which the volume thereof is minimum as shown in FIG. 8A again, and thus this cavity G has completed the whole process of intake, preliminary compression and exhaust once. Similarly, the other three cavities are also performing the same process.

Thus it can be seen from the above description, in the air-compressed rotary unit according to this exemplary embodiment, four cavities independently of each other are performing the process of intake, compression and exhaust, respectively.

The power rotary unit (300) operates while the air-compressed rotary unit (200) is in operation.

Since the ring gear (290) provided on the air-compressed outer rotor end cover (210) and the ring gear (290) provided on the power outer rotor end cover (310) engage with the synchromesh gears (520) respectively, the air-compressed rotary unit and the power rotary unit rotate simultaneously. The air-compressed inner rotor (240) and the power inner rotor (340) have different positions, in detail, when the arc surfaces of the air-compressed inner rotor and the air-compressed outer rotor in the air-compressed rotary unit coincide with each other, there still exists an angle between the power inner rotor and the power outer rotor in the power rotary unit, that is, the arc surfaces of the power inner rotor and the power outer rotor do not coincide with each other (as shown in the power rotary unit at the lower portion of FIG. 8A). When the compressed gas exhaust hole (450) is closed by the air-compressed inner rotor (240), the compressed gas intake hole (480) is not completely closed by the power inner rotor (340). That is, the power rotary unit moves in coordination with the air-compressed rotary unit at an angle difference in gas distribution.

As shown in FIG. 5 and FIGS. 8A-8G, when the compressed gas intake hole (480) is communicated with the intake/exhaust hole of the rotor (360), the preliminarily compressed gas is introduced into the cavity G of the power rotary unit together with the fuel injected from the fuel-injection nozzle (463) through the compressed gas intake hole (480) and the intake/exhaust hole of the rotor (360), and the preliminarily compressed gas is mixed with the fuel into a combustible gas. With the rotation of the power inner rotor and the power outer rotor, the cavity of the power rotary unit further reduces, and the mixed gas is compressed. When the arc surfaces defining the cavity G of the power inner rotor and the power outer rotor coincide with each other, the volume of the intake/exhaust hole of the rotor (360) is the volume of the cavity G, at this time, the spark plug ignition (or compression ignition) is performed, the mixed gas begins to expand to carry out the power stroke, and in this case, the intake/exhaust hole of the rotor (360) is used as the combustion chamber; the expanded gas rotates the power inner rotor and the power outer rotor, such that the volume of the cavity G between the power inner rotor and the power outer rotor becomes large gradually, while the corresponding intake/exhaust hole of the rotor (360) of the cavity G is not communicated with the power distribution pipe (460). When the volume of the cavity G tends to the maximum, the main exhaust hole (461) begins to be communicated with the intake/exhaust hole of the rotor (360), and the exhaust gas in the cavity G is discharged into the power distribution pipe (460) through the intake/exhaust hole of the rotor (360) and the main exhaust hole (461). At this time, the cavity at the right side of the cavity G whose volume tends to the maximum performs a scavenging process, the corresponding intake/exhaust hole of the rotor (360) of the right cavity is communicated with the scavenging hole (462) and the compressed gas intake hole (480) simultaneously, the preliminarily compressed gas enters into this cavity through the compressed gas intake hole (480) and the intake/exhaust hole of the rotor (360), while the exhaust gas remaining in this cavity G is discharged into the power distribution pipe (460) through the scavenging hole (462). In addition, the size of the scavenging hole (462) may be adjusted by the scavenging period adjusting plate (380) and the scavenging period adjusting shaft (390) according to the needs of the rotary engine, so that short circuit resulting from scavenging when the mixed gas enters into the cavity G can be minimized. When the power inner rotor is rotated such that the scavenging hole (462) is not communicated with the intake/exhaust hole of the rotor (360), the mixed gas is still introduced into the cavity G through the compressed gas intake hole (480) communicated with the intake/exhaust hole of the rotor (360), and is further compressed until the arc surfaces defining the cavity G of the power inner rotor and the power outer rotor coincide with each other.

In detail, as shown in FIGS. 8A-8G, the power process of one cavity G in the power rotary unit will be described by taking the lowermost cavity G in FIG. 5 as an example. At this time, as shown in FIG. 8A, since the compressed gas intake hole (480) is communicated with the corresponding intake/exhaust hole of the rotor (360) of this cavity G, the preliminarily compressed gas is introduced into the cavity G together with the fuel injected from the fuel-injection nozzle (463), and the preliminarily compressed gas is mixed with the fuel into a combustible gas. With the rotation of the power inner rotor and the power outer rotor, the mixed gas in this cavity G is further compressed. As shown in FIG. 8B, when the arc surfaces defining this cavity G of the power inner rotor and the power outer rotor coincide with each other, the volume of the intake/exhaust hole of the rotor (360) is the volume of the cavity G and the intake/exhaust hole of the rotor (360) is used as the combustion chamber, at this time, the spark plug (371) ignites, and since the spark plug (371) is located in the middle of the cavity G, the mixed gas in this cavity G can be sufficiently burned. Thereafter, the mixed gas expands to carry out the power stroke, the volume of the cavity G becomes large, and the corresponding intake/exhaust hole of the rotor (360) of the cavity G is not communicated with the power distribution pipe (460), as shown in FIG. 8C. As shown in FIG. 8D, when the volume of the cavity G tends to the maximum with the rotation of the power inner rotor and the power outer rotor, the main exhaust hole (461) is communicated with the corresponding intake/exhaust hole of the rotor (360) of the cavity G, the exhaust gas in this cavity G is discharged into the power distribution pipe (460), and is discharged out of the rotary engine through the exhaust pipe (470). As shown in FIG. 8E, with the rotation of the power inner rotor and the power outer rotor, the scavenging hole (462) is communicated with the corresponding intake/exhaust hole of the rotor (360) of the cavity G, and the exhaust gas in this cavity G is simultaneously discharged into the power distribution pipe (460) through the main exhaust hole (461) and the scavenging hole (462). As shown in FIG. 8F, when the main exhaust hole (461) is not communicated with the corresponding intake/exhaust hole of the rotor (360) of the cavity G, the compressed gas intake hole (480) is communicated with the corresponding intake/exhaust hole of the rotor (360) of the cavity G, the gas preliminarily compressed in the air-compressed rotary unit is introduced into the cavity G through the compressed gas intake hole (480), in the meantime, the fuel-injection nozzle (463) begins to inject the fuel, such that the fuel enters into the cavity G together with the preliminarily compressed gas and forms the mixed gas. At this time, the mixed gas begins to scavenge the cavity G, so as to further discharge out the exhaust gas remaining in the cavity G. In order to avoid the short circuit resulting from scavenging, the size of the scavenging hole (462) may be adjusted by the scavenging period adjusting plate (380) and the scavenging period adjusting shaft (390) according to the needs of the rotary engine, so that short circuit resulting from scavenging when the mixed gas enters into the cavity G can be minimized. As shown in FIG. 8G, with the rotation of the power inner rotor and the power outer rotor, the scavenging hole (462) is not communicated with the corresponding intake/exhaust hole of the rotor (360) of the cavity G, but the compressed gas intake hole (480) is still communicated with the corresponding intake/exhaust hole of the rotor (360) of the cavity G, the preliminarily compressed gas continues to be introduced into the cavity G, in the meantime, the volume of the cavity G becomes small and the mixed gas in the cavity G is further compressed, as shown in FIG. 8A again. In this way, the cavity G in the power rotary unit completes one power stroke.

There are four cavities existing in the power rotary unit according to this exemplary embodiment, while the process of intake, compression and power is carried out in one cavity, the other three cavities also carry out the above process respectively, and the process of introducing the mixed gas, compression, ignition, power and exhaust is carried out in the four cavities independently of each other. The power generated from the power rotary unit is delivered through the power-output shaft.

From the above, it can be seen that the air-compressed rotary unit may introduce the gas from the outside, and then compress the introduced gas through the coordinated motion between the inner rotor and the outer rotor, thereby achieving the process of intake and compression. In view of this function of the air-compressed rotary unit, the air-compressed rotary unit may be used individually as a gas compression pump, in this case, the outer rotor and the inner rotor of the air-compressed rotary unit may be connected to a single shaft via a gear-driven mechanism.

Since the gas introduced into the power rotary unit is a preliminarily compressed gas in the rotary engine, any possible mechanism capable of compressing the gas may be connected to the power rotary unit in addition to the air-compressed rotary unit. That is to say, the rotary engine may only have the above-described power rotary unit therein, and the air-compressed rotary unit may be replaced with other gas compression mechanisms.

In addition, the number of the power rotary unit is not limited to one, and there might be a plurality of power rotary units existing at the same time, so as to generate more power output. In the rotary engine including a plurality of power rotary units, the compressed gas may be supplied to the plurality of power rotary units simultaneously through the gas-supply device described in the above exemplary embodiment.

Therefore, different from the existing two-stroke engine or four-stroke engine, the four cavities in the air-compressed rotary unit and the four cavities in the power rotary unit of the rotary engine according to the exemplary embodiment perform the process of intake, compression, ignition, power and exhaust independently of each other. However, the air-compressed rotary unit and the power rotary unit according to the exemplary embodiment are not limited to have four cavities therein, and the inventive concept may be applicable to less or more cavities than four. The rotary engine according to the exemplary embodiment forms a combined working stroke by two sets of pump bodies rotated in the same direction and rigidly connected at an angle difference, that is, the two sets of pump bodies respectively perform different working strokes during one revolution. The rotary engine according to the exemplary embodiment has the similar intake/exhaust efficiency to that of the existing four-stroke engine, low fuel consumption, low pollution and a high power as the existing two-stroke engine, solves the phenomenon of short circuit resulting from scavenging of the mixed gas in the two-stroke engine, significantly reduces the waste of the mixed gas, which in turn decreases the environmental pollution.

Due to the special design in structure of the rotary engine: the intake/exhaust hole of the rotor (360) in power rotary unit forms a closed combustion chamber with the inner and outer rotors of the power rotary unit when the spark plug ignites for the power stroke at the end of the compression of the combustible gas, and the closed combustion chamber has a smaller surface-to-volume ratio and is more beneficial for the combustion of the mixed gas as compared to the prior triangle rotary engine, a combustion efficiency is improved, meanwhile, the rotary engine may use various fuel such as diesel oil, alcohol, or the like, due to a higher compression ratio, what needs to change is just replacing the spark plug with a high-pressure oil pump.

All the moving parts of the rotary engine perform a non-eccentric rotary motion, such that the vibration can be significantly reduced and the power-weight ratio, power per liter and output torque can be increased. For example, the inner rotor according to the exemplary embodiment performs power stoke four times for each revolution, which is equivalent to the existing eight-cylinder, four-stroke engine, and has a small volume, a light weight and a high power, thereby greatly extending the application range of the engine.

Although the present disclosure have been shown and described with reference to the certain preferred embodiments thereof, it would be appreciated by those skilled in the art that various changes in form and details may be made without departing from the spirit and scope of the present disclosure as defined in the following claims.

What is claimed:

1. A rotary engine, comprising;
   an air-compressed rotary unit provided in an engine body, and a power rotary unit moving in coordination with the air-compressed rotary unit;
   the air-compressed rotary unit comprises
      an outer rotor rotatably mounted within the engine body and an inner rotor eccentrically rotatably within the outer rotor, and is provided with an intake port for introducing an external gas and a gas-guide port for discharging a compressed gas,
      inner teeth constituted by a plurality of convex arc surfaces are formed in an inner circumference of the outer rotor,
      outer teeth constituted by a plurality of concave arc surfaces are formed in an outer circumference of the inner rotor, and
      a plurality of cavities independent of each other are formed in such a manner that tops of every two adjacent outer teeth contact with corresponding arc surfaces of the inner teeth, whereby volumes of respective cavities change during the engagement and disengagement between the inner teeth and the outer teeth as the inner and outer rotors rotate relative to each other, and thus achieve intake stroke and compression stroke of the air-compressed rotary unit;
   the power rotary unit comprises an outer rotor rotatably mounted within the engine body and an inner rotor eccentrically rotatably within the outer rotor, and is provided with a gas-supply port for introducing the compressed gas discharged from the air-compressed rotary unit, and an exhaust port for discharging a burned gas, inner teeth constituted by a plurality of convex arc surfaces are formed in an inner circumference of the outer rotor, outer teeth constituted by a plurality of concave arc surfaces are formed in an outer circumference of the inner rotor, and a plurality of cavities independent of each other are formed in such a manner that tops of every two adjacent outer teeth contact with corresponding arc surfaces of the inner teeth, whereby volumes of respective cavities change during the engagement and disengagement between the inner teeth and the outer teeth as the inner and outer rotors rotate relative to each other, and thus achieve power stroke and exhaust stroke of the power rotary unit,
   the intake port and the gas-guide port of the air-compressed rotary unit are provided on a hollow compressor shaft rotatably supporting the inner rotor of the air-compressed rotary unit, and an opening is provided on each concave arc surface of the inner rotor of the air-compressed rotary unit, such that the opening is communicated with the intake port and the gas-guide port respectively when the inner rotor of the air-compressed rotary unit rotates around the hollow compressor shaft,
   the gas-supply port and the exhaust port of the power rotary unit are provided on a hollow power shaft rotatably supporting the inner rotor of the power rotary unit, and an opening is provided on each concave arc surface of the inner rotor of the power rotary unit, such that the opening is communicated with the gas-supply port and the exhaust port respectively when the inner rotor of the power rotary unit rotates around the hollow power shaft.

2. The rotary engine of claim 1, wherein the power rotary unit moves in coordination with the air-compressed rotary unit at an angle difference in gas distribution.

3. The rotary engine of claim 2, wherein the outer and inner rotors of the air-compressed rotary unit are connected to a power-output shaft provided in the engine body via a gear-driven mechanism, and the outer and inner rotors of the power rotary unit are connected to the power-output shaft via the gear-driven mechanism to rotate the inner and outer rotors at different speeds so that the inner and outer rotors rotate relative to one another.

4. The rotary engine of claim 2, wherein the inner rotor of the air-compressed rotary unit is rigidly connected with the inner rotor of the power rotary unit.

5. The rotary engine of claim 1, wherein a protrusion portion formed between every two adjacent concave arc surfaces of respective inner rotors in the air-compressed rotary unit and the power rotary unit is provided with a blade, to enhance the seal between tops of the outer teeth of the inner rotor and the corresponding arc surfaces of the inner teeth of the outer rotor.

6. The rotary engine of claim 5, wherein the blade is provided in a radial direction of the inner rotor.

7. The rotary engine of claim 5, wherein the blade is provided elastically.

8. The rotary engine of claim 1, wherein the intake port and the gas-guide port of the air-compressed rotary unit are connected to an intake passage for introducing the external gas and a gas-guide passage for discharging the compressed gas provided in the hollow power shaft respectively.

9. The rotary engine of claim 8, wherein the intake port is provided at a position where the volume of the cavity tends to increase, such that the external gas is introduced into the cavity via the intake port with the aid of pressure difference, and the gas-guide port is provided at the position where the volume of the cavity tends to decrease, such that the gas in the cavity is discharged via the gas-guide port after being compressed.

10. The rotary engine of claim 1, wherein the gas-supply port and the exhaust port of the power rotary unit are connected to a gas-supply passage for introducing the compressed gas and an exhaust passage for discharging the burned gas provided in the hollow power shaft respectively.

11. The rotary engine of claim 10, wherein the gas-supply port is provided at a position where the volume of the cavity tends to the minimum, such that the compressed gas is further compressed after being introduced into the cavity via the gas-supply passage, and the exhaust port is provided at the position where the volume of the cavity tends to decrease, such that the burned gas in the cavity is discharged via the exhaust port.

12. The rotary engine of claim 11, further comprising a fuel-supply device provided at a position of the hollow power shaft close to the gas-supply port, such that the burned gas under the action of the fuel expands towards a direction in which the volume of the cavity is gradually enlarged when the compressed gas in the cavity is compressed to the maximum pressure.

13. The rotary engine of claim 12, wherein the fuel-supply device comprises a fuel-injection nozzle.

14. The rotary engine of claim 13, wherein the fuel-supply device further comprises a spark plug.

15. The rotary engine of claim 11, wherein a scavenging port is provided at the position of the hollow power shaft adjacent to the exhaust port and connected with a scavenging passage provided in the hollow power shaft, such that the remaining burned gas is discharged via the scavenging passage when the opening provided in the inner rotor of the power rotary unit is communicated with the scavenging port.

16. The rotary engine of claim 15, wherein a scavenging period adjusting plate is provided at the scavenging port, to adjust an amount of the gas discharged from the scavenging port in real time according to an operating speed of the power rotary unit.

17. The rotary engine of claim 1, wherein inner teeth constituted by five convex arc surfaces are respectively formed in the inner circumferences of respective outer rotors in the air-compressed rotary unit and the power rotary unit, and outer teeth constituted by four concave arc surfaces are respectively formed in the outer circumferences of respective inner rotors provided eccentrically within the outer rotors respectively.

18. The rotary engine of claim 17, wherein the air-compressed rotary unit and the power rotary unit are provided in series within the engine body, and the engine body comprises an air-compressed body end cover, a power body end cover and a main body connected to the air-compressed body end cover and the power body end cover.

19. The rotary engine of claim 18, wherein the engine body further comprises an outer rotor end cover and an inner rotor end cover rigidly connected to the outer rotor and the inner rotor of the air-compressed rotary unit respectively, and an outer rotor end cover and an inner rotor end cover rigidly connected to the outer rotor and the inner rotor of the power rotary unit respectively.

20. The rotary engine of claim 19, wherein the inner rotor of the air-compressed rotary unit and the inner rotor of the power rotary unit rotate around the hollow compressor and power shafts respectively provided in the engine body, wherein the hollow compressor shaft in the air-compressed rotary unit and the hollow power shaft in the power rotary unit are fixed relative to the engine body.

21. The rotary engine of claim 20, wherein the power-output shaft respectively connected to the air-compressed rotary unit and the power rotary unit is provided below the engine body.

22. The rotary engine of claim 19, wherein cooling and lubricating fluid channels are provided inside of respective inner and outer rotors of the air-compressed rotary unit and the power rotary unit, and match with cooling and lubricating fluid channels on the respective outer and inner rotor end covers.

23. An air-compressed rotary unit provided in an engine body, comprising an outer rotor and an inner rotor provided eccentrically within the outer rotor, the air-compressed rotary unit is provided with an intake port for introducing an external gas and a gas-guide port for discharging a compressed gas, inner teeth constituted by a plurality of convex arc surfaces are formed in an inner circumference of the outer rotor, outer teeth constituted by a plurality of concave arc surfaces are formed in an outer circumference of the inner rotor, and a plurality of cavities independent of each other are formed in such a manner that tops of every two adjacent outer teeth contact with corresponding arc surfaces of the inner teeth, whereby volumes of respective cavities change during the engagement and disengagement between the inner teeth and the outer teeth, and thus achieve intake, compression and exhaust of the air-compressed rotary unit, the intake port and the gas-guide port of the air-compressed rotary unit are provided on a hollow compressor shaft in the inner rotor of the air-compressed rotary unit respectively, and an opening is provided on each concave arc surface of the inner rotor of the air-compressed rotary unit, such that the opening is communicated with the intake port and the gas-guide port respectively when the inner rotor of the air-compressed rotary unit rotates around the hollow compressor shaft.

24. The air-compressed rotary unit of claim 23, wherein the outer rotor and the inner rotor are connected to a single shaft via a gear-driven mechanism to rotate the inner and outer rotors at different speeds so that the inner and outer rotors rotate relative to one another.

25. The air-compressed rotary unit of claim 23, wherein a protrusion portion formed between every two adjacent concave arc surfaces of the inner rotor is provided with a blade, to enhance the seal between top of the outer tooth of the inner rotor and the corresponding arc surface of the inner tooth of the outer rotor.

26. The air-compressed rotary unit of claim 23, wherein the intake port and the gas-guide port are provided on a hollow compressor shaft in the inner rotor respectively, and connected to an intake passage for introducing the external gas and a gas-guide passage for discharging the compressed gas provided in the hollow power shaft respectively, and an opening is provided on each concave arc surface of the inner rotor, such that the opening is communicated with the intake port and the gas-guide port respectively when the inner rotor rotates around the hollow power shaft.

27. The air-compressed rotary unit of claim 26, wherein the intake port is provided at the position where the volume of the cavity tends to change from being small to being large, such that the external gas is introduced into the cavity via the intake port with the aid of pressure difference, and the gas-guide port is provided at the position where the volume of the cavity tends to change from being large to being small, such that the gas in the cavity is discharged via the gas-guide port after being compressed.

28. The air-compressed rotary unit of claim 23, wherein inner teeth constituted by five convex arc surfaces are formed in the inner circumference of the outer rotor, and outer teeth constituted by four concave arc surfaces are formed in the outer circumference of the inner rotor provided eccentrically within the outer rotor.

29. A power rotary unit provided in an engine body, comprising an outer rotor and an inner rotor provided eccentrically within the outer rotor, the power rotary unit is provided with a gas-supply port for introducing a compressed gas, and a and an exhaust port for discharging a burned gas, inner teeth constituted by a plurality of convex arc surfaces are formed in an inner circumference of the outer rotor, outer teeth constituted by a plurality of concave arc surfaces are formed in an outer circumference of the inner rotor, and a plurality of cavities independent of each other are formed in such a manner that tops of every two adjacent outer teeth contact with corresponding arc surfaces of the inner teeth, whereby volumes of respective cavities change during the engagement and disengagement between the inner teeth and the outer teeth, and thus achieve power and exhaust of the power rotary unit, the gas-supply port and the exhaust port of the power rotary unit are provided on a hollow power shaft in the inner rotor of the power rotary unit respectively, and an opening is provided on each concave arc surface of the inner rotor of the power rotary unit, such that the opening is communicated with the gas-supply port and the exhaust port respectively when the inner rotor of the power rotary unit rotates around the hollow power shaft.

30. The power rotary unit of claim 29, wherein the outer rotor and the inner rotor are connected to a power-output shaft via a gear-driven mechanism which rotate the inner and outer rotors at different speeds so that the inner and outer rotors rotate relative to one another.

31. The power rotary unit of claim 29, wherein a protrusion portion formed between every two adjacent concave arc surfaces of the inner rotor is provided with a blade, to enhance the seal between top of the outer tooth of the inner rotor and the corresponding arc surface of the inner tooth of the outer rotor.

32. The power rotary unit of claim 29, wherein the gas-supply port and the exhaust port are provided on a hollow power shaft in the inner rotor respectively, and connected to a gas-supply passage for introducing the compressed gas and an exhaust passage for discharging the burned gas provided in the hollow power shaft respectively, and an opening is provided on each concave arc surface of the inner rotor, such that the opening is communicated with the gas-supply port and the exhaust port respectively when the inner rotor rotates around the hollow power shaft.

33. The power rotary unit of claim 32, wherein the gas-supply port is provided at the position where the volume of the cavity tends to the minimum, such that the compressed gas is further compressed after being introduced into the cavity via the gas-supply passage, and the exhaust port is provided at the position where the volume of the cavity tends to change from being large to being small, such that the burned gas in the cavity is discharged via the exhaust port.

34. The power rotary unit of claim 33, wherein the fuel-supply device is provided at the position of the hollow power shaft close to the gas-supply port, such that the burned gas under the action of the fuel expands towards the direction in which the volume of the cavity is gradually enlarged when the compressed gas in the cavity is compressed to the maximum pressure.

35. The power rotary unit of claim 33, wherein a scavenging port is provided at the position of the hollow power shaft adjacent to the exhaust port and connected with a scavenging passage provided in the hollow power shaft, such that the remaining burned gas is discharged via the scavenging passage when the opening provided in the inner rotor is communicated with the scavenging port.

36. The power rotary unit of claim 35, wherein a scavenging period adjusting plate is provided at the scavenging port, to adjust an amount of the gas discharged from the scavenging port in real time according to an operating speed of the power rotary unit.

37. The power rotary unit of claim 29, wherein inner teeth constituted by five convex arc surfaces are formed in the inner circumference of the outer rotor, and outer teeth constituted by four concave arc surfaces are formed in the outer circumference of the inner rotor provided eccentrically rotatable within the outer rotor.

* * * * *

UNITED STATES PATENT AND TRADEMARK OFFICE
CERTIFICATE OF CORRECTION

PATENT NO. : 9,920,687 B2
APPLICATION NO. : 13/995006
DATED : March 20, 2018
INVENTOR(S) : Gang Li et al.

Page 1 of 1

It is certified that error appears in the above-identified patent and that said Letters Patent is hereby corrected as shown below:

In the Claims

Column 21, Line 14, Claim 29:
After "introducing a compressed gas,"
Delete "and a".

Signed and Sealed this
Tenth Day of July, 2018

Andrei Iancu
*Director of the United States Patent and Trademark Office*